(12) United States Patent
Zaffetti et al.

(10) Patent No.: US 10,018,424 B2
(45) Date of Patent: Jul. 10, 2018

(54) COUNTER SPIRAL TUBE AND SHELL HEAT EXCHANGER

(71) Applicant: HAMILTON SUNDSTRAND CORPORATION, Charlotte, NC (US)

(72) Inventors: Mark A. Zaffetti, Suffield, CT (US); Jeremy M. Strange, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 127 days.

(21) Appl. No.: 15/016,619

(22) Filed: Feb. 5, 2016

(65) Prior Publication Data

US 2017/0227293 A1   Aug. 10, 2017

(51) Int. Cl.
| | |
|---|---|
| F28D 7/02 | (2006.01) |
| F28F 13/06 | (2006.01) |
| F28D 7/16 | (2006.01) |
| F28D 15/00 | (2006.01) |
| F28D 21/00 | (2006.01) |

(52) U.S. Cl.
CPC ........... *F28D 7/022* (2013.01); *F28D 7/1607* (2013.01); *F28D 15/00* (2013.01); *F28F 13/06* (2013.01); *F28D 2021/0021* (2013.01)

(58) Field of Classification Search
CPC ........ F28D 7/022; F28D 7/1607; F28D 15/00; F28D 2021/0021; F28F 13/06
See application file for complete search history.

(56) References Cited

U.S. PATENT DOCUMENTS

| | | | |
|---|---|---|---|
| 1,893,484 A | 1/1933 | Belt | |
| 5,117,904 A | 6/1992 | Bond | |
| 5,309,987 A | 5/1994 | Carlson | |
| 5,379,832 A | 1/1995 | Dempsey | |
| 8,540,011 B2 | 9/2013 | Wang et al. | |
| 9,134,072 B2 | 9/2015 | Roisin et al. | |
| 2006/0124285 A1 | 6/2006 | Kite et al. | |
| 2011/0011572 A1 | 1/2011 | Nagurny et al. | |
| 2013/0233526 A1 | 9/2013 | Hislop | |

(Continued)

FOREIGN PATENT DOCUMENTS

| | | |
|---|---|---|
| CN | 102538562 B | 8/2013 |
| WO | 2013092415 A2 | 6/2013 |
| WO | 2015126483 | 8/2015 |

OTHER PUBLICATIONS

European Search Report for European Application No. 17153996.8 dated Jul. 14, 2017.

*Primary Examiner* — Moshe Wilensky

(74) *Attorney, Agent, or Firm* — Carlson, Gaskey & Olds, P.C.

(57) ABSTRACT

A heat exchanger has an outer shell enclosing an inner chamber and extending between a first inlet and a first outlet. The chamber receives a separating wall. The shell extends between axial ends, and generally along a helix. The helix is defined with the wall moving in a continuous manner along a first axial direction and with a circumferential component between the first inlet and the first outlet. A plurality of tubes extend through openings in the separating wall and generally along a helix. The plurality of tubes extend from a second inlet and a second outlet, and with the helix defined along the first axial direction and with a component in a circumferential direction. A method and a temperature control system are also disclosed.

4 Claims, 6 Drawing Sheets

(56) References Cited

U.S. PATENT DOCUMENTS

| | | | |
|---|---|---|---|
| 2013/0236299 A1* | 9/2013 | Kington | F02C 7/10 |
| | | | 415/177 |
| 2014/0284038 A1* | 9/2014 | Vedula | B22F 3/1055 |
| | | | 165/185 |
| 2014/0360698 A1 | 12/2014 | Waldman et al. | |
| 2015/0179485 A1 | 6/2015 | Hiroki | |

* cited by examiner

COUNTER SPIRAL TUBE AND SHELL HEAT EXCHANGER

BACKGROUND OF THE INVENTION

This application relates to a unique heat exchanger and a method of forming such a heat exchanger.

Heat exchangers are utilized in any number of applications. In one type of heat exchanger, an outer shell surrounds a plurality of tubes. One fluid is circulated through the outer shell and a second fluid is circulated through the tubes. The two fluids exchange heat with each other, and cooling or heating, or both is achieved.

It is typical that in such a shell and tube heat exchanger the tubes extend along a linear direction. In some applications, one of the two fluids may be in two distinct phases within the heat exchanger. When this occurs, efficient heat transfer between the two fluids raises challenges.

SUMMARY OF THE INVENTION

A heat exchanger has an outer shell enclosing an inner chamber and extending between a first inlet and a first outlet. The chamber receives a separating wall. The shell extends between axial ends, and generally along a helix. The helix is defined with the wall moving in a continuous manner along a first axial direction and with a circumferential component between the first inlet and the first outlet. A plurality of tubes extend through openings in the separating wall and generally along a helix. The plurality of tubes extend from a second inlet and a second outlet, and with the helix defined along the first axial direction and with a component in a circumferential direction.

A method and a temperature control system are also disclosed.

These and other features may be best understood from the following drawings and specification.

DETAILED DESCRIPTION

Figure 1:
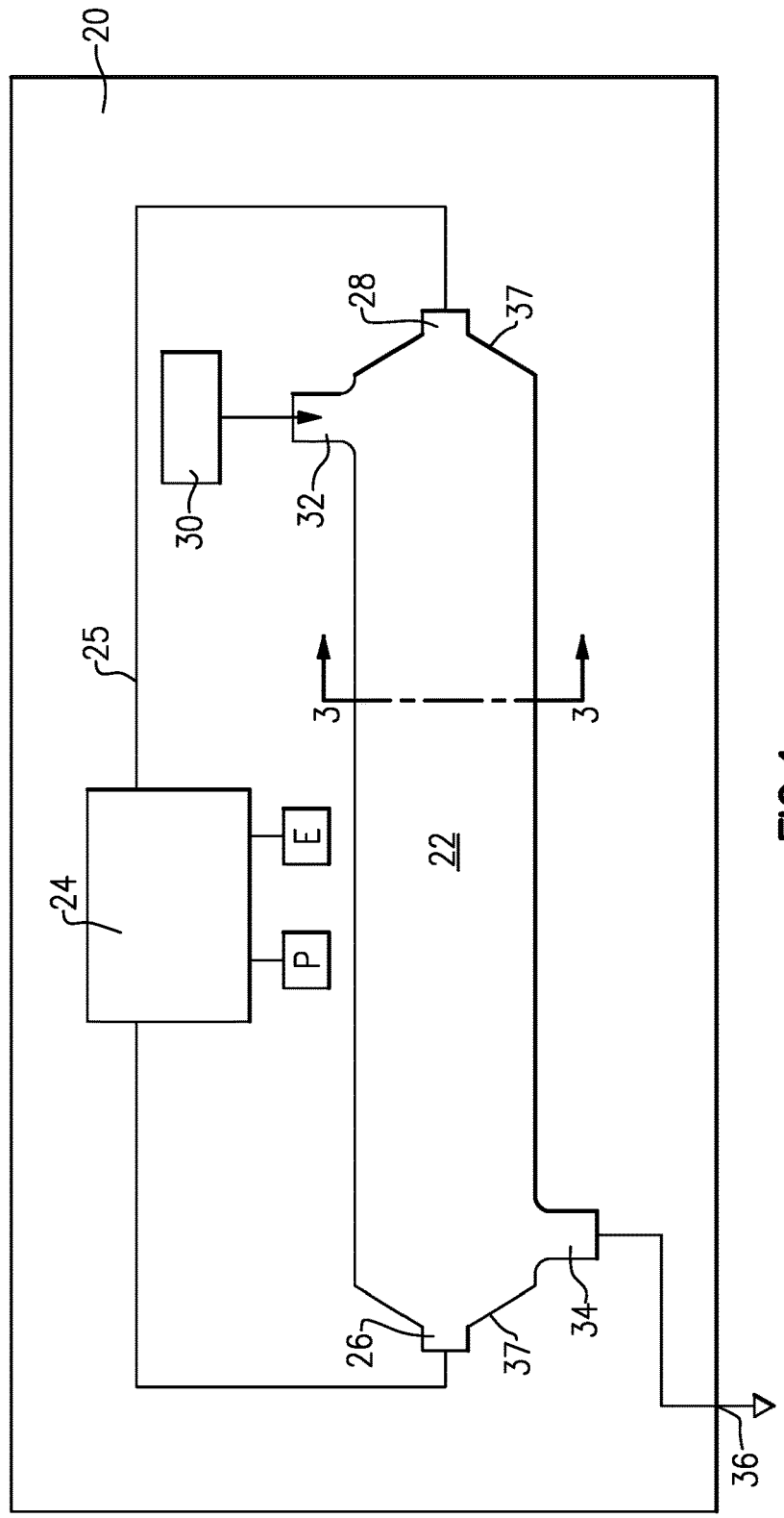
FIG. 1 shows a temperature control system in a spaceship.

FIG. 1 schematically shows a spaceship 20. A heat exchanger 22 is incorporated into the spaceship. A heat sink 24 draws heat away from elements such as electronics E and passenger or astronaut support systems P.

A refrigerant circuit 25 circulates a refrigerant to cool the heat sink 24. The circuit 25 delivers refrigerant into an inlet 26 in the heat exchanger and outwardly of an outlet 28 to return to the circuit 25. A source of a second coolant 30 communicates with a second inlet 32 and delivers the second fluid to an outlet 34. In this arrangement, the second fluid 30 is stored in a tank on the spaceship, vaporized within the heat exchanger 22 and delivered outwardly of the spacecraft 20 as shown schematically at 36 into a surrounding environment. Of course, in embodiments, the second fluid may be maintained in a closed circuit and not delivered to the atmosphere. Of course, the connection to the inlets 26/32 and outlets 28/34 may be reversed, with the sacrificial fluid utilizing the connections 26/28. Moreover, while the fluids are shown in counter-flow orientation that is flowing in opposed axial directions between axial end 37 of the heat exchanger 22, it may flow in the same axial direction.

Figure 2:
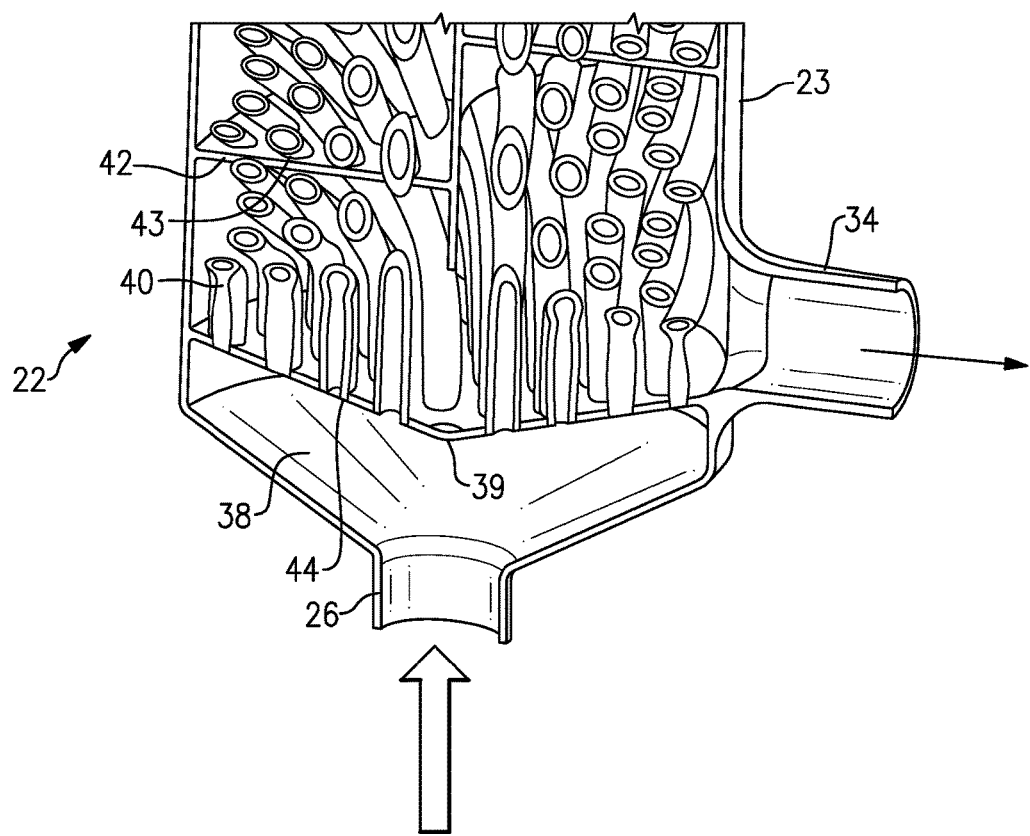
FIG. 2 shows a detail of a heat exchanger included in the FIG. 1 system.

FIG. 2 shows an internal detail of the heat exchanger 22. As shown, a chamber 38 is defined by an end wall 39. The heat exchanger 22 is provided with a shell 23 and receives a plurality of tubes 40, shown partially. The tubes 40 extend through a separating wall 42 which forms a portion of the shell 23, as will be explained better below. The tubes 40 extend through holes 43 in the wall 42 and are also shown to extend to holes 44 in the end wall 39. Fluid coming into the inlet 26 moves into chamber 38, and then into the tubes 40. As mentioned above, the fluid may flow in the opposed direction.

The tubes extend continuously along an axial length of the heat exchanger 22. The separating wall 42 extends along an axial length generally between spaced end walls 39.

Figure 3A:
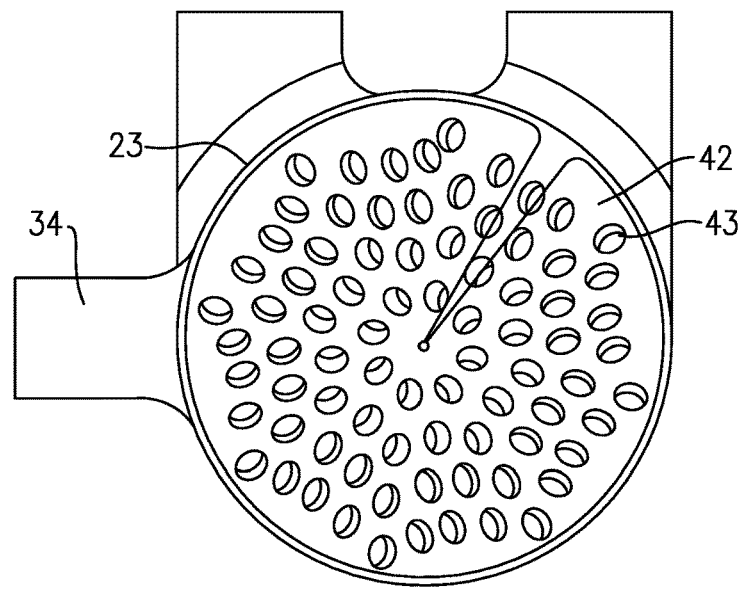
FIG. 3A is a first view along line 3-3 as shown in FIG. 1.

FIG. 3A shows the shell 23 without the tubes. As shown, the wall 42 has a plurality of holes.

Figure 3B:
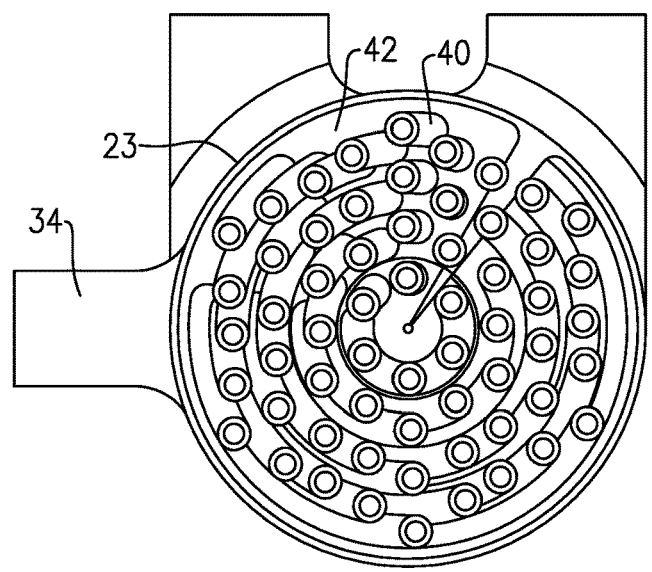
FIG. 3B shows further details of the cross-section at 3-3.

FIG. 3B shows a similar view, but with the tubes 40 extending through the holes 43.

Figure 4A:
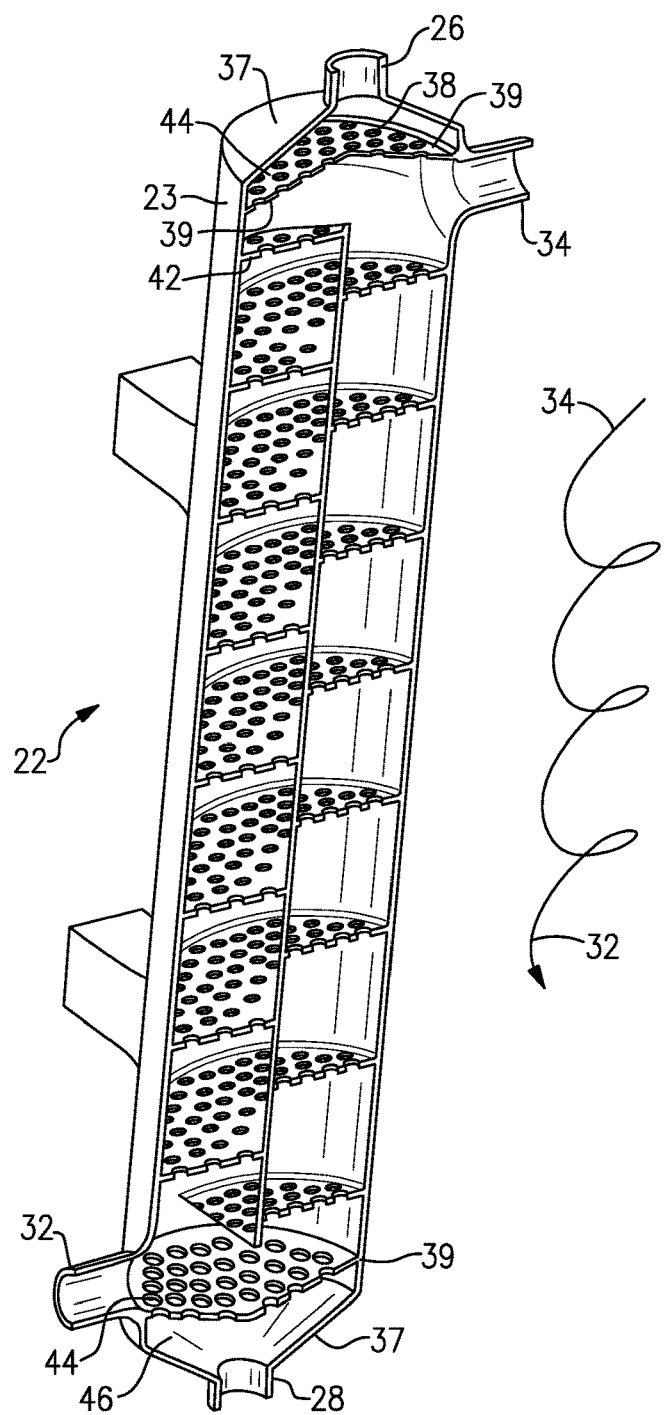
FIG. 4A shows a first portion of the heat exchanger with tubes omitted.

FIG. 4A again shows the shell 23 without the tubes. As can be seen, there are end walls 39 adjacent each axial end 37 of the shell 23. The chamber 38 will communicate with tubes (not shown) extending through the holes 44 in end walls 39. This fluid will then pass through an axial length of the heat exchanger to the chamber 46 and then communicate to the port 28 at an opposed axial end 37.

The shell 23 includes a fluid chamber for receiving a fluid through the inlet 32 and outlet 34, and extending along a helix. It should be understood that this a cross-section and the helix would be generally continuous between its axial ends. The helix is shown schematically between the ports 34 and 32 extending within an axial component and with a circumferential component shown in this embodiment to be counterclockwise from a first axial end towards a second axial end.

Figure 4B:
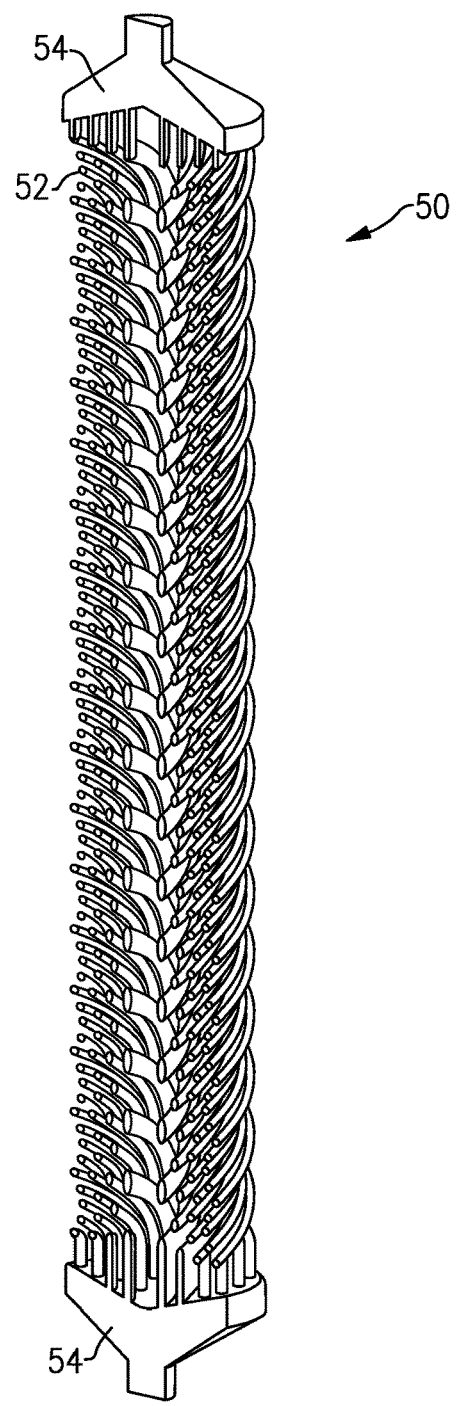
FIG. 4B is a reverse illustration of fluid flow in the tubes of the heat exchanger.

FIG. 4B is a reverse model 50 of the flow passages through the tubes 40. That is, it does not show the tubes, but rather the flow passages within the tubes. As shown, flow sections 54 are formed within the chambers 38 and 46. The flow passages through the tubes is shown at 52. As can be appreciated from this figure, the tubes also extend along a helix.

Figure 4C:
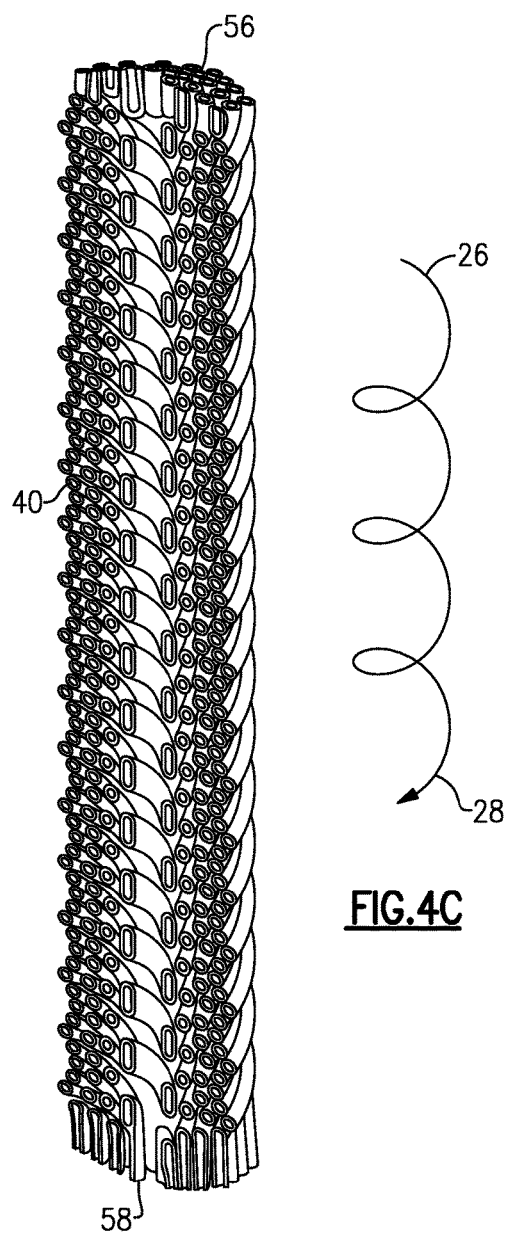
FIG. 4C shows the structure that forms the reverse portion shown in FIG. 4A.

FIG. 4C shows the tubes 40 extending from a straight portion 56 then along a helix and to a second straight portion 58. Straight portion 56 extends to holes 44 in one end wall 39 and the straight portions 58 extends to holes 44 in the other end wall 39. Between the ends, the tubes 40 extend along a helix, as mentioned above.

As shown schematically, in this figure, the helix of the tubes 40 (when considered in the same axial direction as the helix for the shell 23) extends axially and in a circumferentially opposed direction to that of the shell passage. Thus, as illustrated in FIG. 4C from the illustrated top to the illustrated bottom, the helix will be generally clockwise.

By reversing the direction of the two flow passages, better momentum and better heat exchange efficiency is achieved. This becomes particularly valuable when one of the two fluids is a two-phase fluid. The helix configuration improves flow distribution of the two-phase fluid, in turn improving heat exchanger efficiency.

It should be understood, as mentioned with regard to FIG. 1, that the flow between the shell and the tubes may be in an opposed, or the same, axial direction, however, when the structure is looked at along a common axial direction, the shell and the tubes extend through opposed circumferential directions.

In a broader aspect of this disclosure, the two may also extend in a common circumferential direction.

Stated another way, a heat exchanger 22 comprises an outer shell 23 defining an inner chamber and extending between a first inlet and a first outlet. The chamber is defined by a separating wall 42. The shell extends between axial ends 37, and the separating wall 42 extends generally along a helix, with the helix being defined as the wall moving in a continuous manner, and along a first axial direction and with a component in a circumferential direction between the first inlet and the first outlet. A plurality of tubes 40 extend through a plurality of openings 43 in wall 42. The plurality of tubes 40 receive a fluid from a second inlet, and deliver the fluid to a second outlet. The plurality of tubes 40 extend in the first axial direction and with a circumferential component.

When utilized in this disclosure, the term "helix" does not mean a pure mathematical helix. Rather, it is intended to imply a structure which extends along an axial direction and with a circumferential component. Structures coming within the scope of this disclosure may move away from a purely mathematical formula for defining a "helix."

Figure 5:
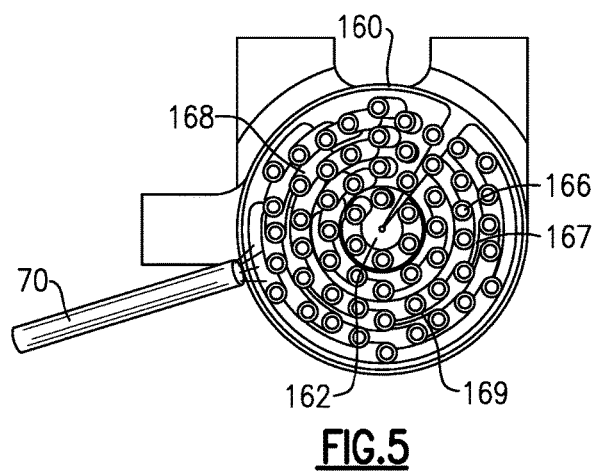
FIG. 5 schematically shows a manufacturing method.

As can be appreciated, to form such a complex system would be challenging. However, as schematically shown in FIG. 5, applicant has developed a method of forming such a heat exchanger. As shown in FIG. 5, a portion 160 of the outer shell has been formed as has wall portion 162. An end 169 of the wall formed to this point is also shown. As shown, tube portions 166 from a lower end 167 of the wall 160 extend along the helix as mentioned above. Other tube portions 168 are also being formed.

As shown schematically at 70, the formation may be by an additive manufacturing process shown schematically.

Any type of additive manufacturing processes may be used. Such processes build up the heat exchanger through layers. While the buildup is shown extending along the axial direction, the heat exchanger could also be formed by an additive manufacturing process extending from one circumferential side of the shell 23 to the other and forming the flow passages intermediate the two sides.

In particular, electron beam or laser disposition additive manufacturing for metals may be utilized for this method. Laser disposition is particularly beneficial for smaller sized heat exchangers.

The method could be said to comprise forming an outer shell by additive manufacturing, and forming an inner chamber extending between a first inlet and a first outlet. The chamber is formed with a separating wall 43. The shell is formed to extend between axial ends. The separating wall is formed extending generally along a helix, with the wall extending a first axial dimension and with a component in a circumferential direction between the first inlet and the first outlet. A plurality of tubes are also formed extending through the wall. The plurality of tubes are formed generally along a helix to extend in the first axial direction and with a circumferential component.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of forming a heat exchanger comprising:
   forming an outer shell by additive manufacturing and forming an inner chamber extending between a first inlet and a first outlet;
   forming said chamber with a separating wall;
   extending said shell between axial ends forming said separating wall extending generally along a helix with the wall extending a first axial direction and with a circumferential component between said first inlet and said first outlet;
   a plurality of tubes also formed extending through openings in said separating wall, and said plurality of tubes are formed generally along a helix extending in said first axial direction with a circumferential component;
   forming end walls within said shell at a second inlet and at a second outlet, and forming said end walls to have holes and said tubes extending to said holes to communicate with end chambers defined outward of said end walls; and
   said tubes formed with a straight portion extending from said holes, and leading into said helix.

2. The method as set forth in claim 1, wherein when looked at along the same said first axial direction, said separating wall circumferential component being in an opposed circumferential direction relative to said circumferential component of said plurality of tubes.

3. The method as set forth in claim 1, wherein said first inlet and said first outlet are formed to extend circumferentially outwardly through an outer wall of said shell.

4. The method as set forth in claim 3, wherein said second inlet and said second outlet are formed to extend outwardly through the axial ends of said shell.

* * * * *